United States Patent
Albasheir et al.

(10) Patent No.: US 11,765,211 B2
(45) Date of Patent: Sep. 19, 2023

(54) CAPABILITIES-BASED NETWORK SELECTION FOR CELLULAR DEVICES

(71) Applicant: T-Mobile USA, Inc., Bellevue, WA (US)

(72) Inventors: Suliman Albasheir, Issaquah, WA (US); Swetha Gopisetti, Issaquah, WA (US); Muhammad Waqar Afzal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 451 days.

(21) Appl. No.: 17/001,077

(22) Filed: Aug. 24, 2020

(65) Prior Publication Data
US 2022/0060519 A1 Feb. 24, 2022

(51) Int. Cl.
*H04L 65/1104* (2022.01)
*H04W 12/37* (2021.01)
(Continued)

(52) U.S. Cl.
CPC ...... *H04L 65/1104* (2022.05); *H04L 12/1407* (2013.01); *H04L 65/1016* (2013.01);
(Continued)

(58) Field of Classification Search
CPC ............. H04L 65/1104; H04L 65/1045; H04L 65/1016; H04L 65/1043; H04L 12/1407; H04W 12/37; H04W 12/084
See application file for complete search history.

(56) References Cited

U.S. PATENT DOCUMENTS 10,588,056 B2 * 3/2020 Sahin ................ H04W 36/0022
2018/0191896 A1 * 7/2018 Beardow ........... H04M 1/72469
(Continued)

FOREIGN PATENT DOCUMENTS

WO    WO2020063971 A1    4/2020

OTHER PUBLICATIONS

3rd Generation Partnership Project, "Technical Specification Group Services and System Aspects; Study on Enhanced IMS to 5GC Integration", vol. SA WG2, No. V2.0.0, Dec. 3, 2019, pp. 1-83.
(Continued)

*Primary Examiner* — Azizul Choudhury
(74) *Attorney, Agent, or Firm* — Lee & Hayes, P.C.

(57) ABSTRACT

In a cellular system having both $4^{th}$-Generation (4G) and $5^{th}$-Generation (5G) cellular networks, cellular device sends a Session Initiation Protocol (SIP) INVITE message to initiate a voice call. The message is received and acted upon by a Proxy-Call Session Control Function (P-CSCF) of an IP Multimedia Subsystem (IMS). Cellular devices that support 5G services are configured to include an information element (IE) in the SIP INVITE message to indicate support for 5G services. When responding to a SIP INVITE message, the P-CSCF determines whether the SIP INVITE message includes such an IE. If the SIP INVITE message contains an IE indicating 5G support, the P-CSCF sends an Authorization Authentication Request (AAR) message to a 5G Policy Control Function (PCF) to initiate a 5G dedicated bearer. Otherwise, the P-CSCF sends the AAR to a 4G Policy and Charging Rules Function (PCRF) to initiate a 4G dedicated bearer.

20 Claims, 3 Drawing Sheets

(51) Int. Cl.
*H04W 12/084* (2021.01)
*H04L 12/14* (2006.01)
*H04L 65/1016* (2022.01)
*H04L 65/1043* (2022.01)
*H04L 65/1045* (2022.01)

(52) U.S. Cl.
CPC ...... *H04L 65/1043* (2013.01); *H04L 65/1045* (2022.05); *H04W 12/084* (2021.01); *H04W 12/37* (2021.01)

(56) References Cited

U.S. PATENT DOCUMENTS

| | | |
|---|---|---|
| 2019/0306324 A1 | 10/2019 | Al-Mehdar |
| 2021/0036919 A1* | 2/2021 | Foti ................... H04L 65/1016 |
| 2021/0051530 A1* | 2/2021 | Venkataraman ...... H04W 88/06 |

OTHER PUBLICATIONS

Extended European Search Report dated Jan. 5, 2022 for European Patent Application No. 21191399.1, 18 pages.
Nokia, et al, "Selection of the PCC interface when P-CSCF uses both Rx and N5", 3GPP Draft; S2-184903_PCR23794PCC Interface Selection_V1, 3rd Generation Partnership Project, vol. SA WG2, May 27, 2018, 5 pages.
Qualcomm Incorporated, "Remaining Issues in UE Radio Capability for IMS Voice", 3rd Generation Partnership Project, vol. RAN WG2, Oct. 28, 2018, 6 pages.
The European Office Action dated Jan. 26, 2023 for European patent No. 21191399.1, a foreign counterpart of U.S. Appl. No. 17/001,077, 9 pages.

* cited by examiner

CAPABILITIES-BASED NETWORK SELECTION FOR CELLULAR DEVICES

BACKGROUND

As cellular communication networks have adopted new technologies, older technologies often remain available for use. Legacy systems may be used as backups and to serve geographic areas in which the newer are not yet implemented. Legacy technologies may also be supported in order to provide service to customers whose devices do not support the newer technologies.

As an example, $4^{th}$-Generation (4G) cellular networks continue to be used during development and deployment of $5^{th}$-Generation (5G) cellular networks. This allows existing 4G mobile devices to be used in places where a network has not implemented 5G technologies.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for initiating a voice communication session in a system that supports both current and legacy cellular technologies, such as cellular communication networks that support legacy $4^{th}$-Generation networks while also having at least partial deployment of newer $5^{th}$-Generation (5G) technologies.

A voice communication session is typically initiated when a mobile device sends a Session Initiation Protocol (SIP) INVITE message to its network. An IP Multimedia Session (IMS) core of the network responds to a SIP INVITE message by establishing a dedicated bearer. However, establishing a dedicated bearer with a mobile device involves different procedures, depending on whether the dedicated bearer will use 4G or 5G technologies. If the dedicated bearer will use 4G technologies, the IMS core communicates with a Policy and Charging Rules Function (PCRF), which is part of a 4G system, to request the establishment of the dedicated bearer. If the dedicated bearer will use 5G technologies, the IMS core communicates with a Policy Control Function (PCF), which is part of a 5G system, to request the dedicated bearer.

In some situations, however, the IMS core may not have information regarding the capabilities of the mobile device with which the dedicated bearer will be established, and therefore may not be able to determine which of the 4G and 5G systems to use for the dedicated bearer.

In embodiments described herein, a 5G-capable device that initiates a Voice over IP (VOIP) communication session adds an Information Element (IE) as part of its SIP INVITE message to indicate that the device supports 5G cellular communications. The IMS core uses this indication to determine whether to establish a dedicated bearer through the network's 4G system or 5G system. Specifically, if the SIP INVITE message has an IE indicating that the device supports 5G, the dedicated bearer is established through the PCR of the 5G system. Otherwise, if the IE indicates that the system does not support 5G or if the IE is absent from the SIP INVITE message, the dedicated bearer is established through the PCRF of the 4G system.

The described techniques improve the experiences of users by ensuring that legacy 4G devices are able to function within a network even after the network has implemented 5G technologies, while allowing 5G-compatible devices to take advantage of any available 5G technologies.

Figure 1:
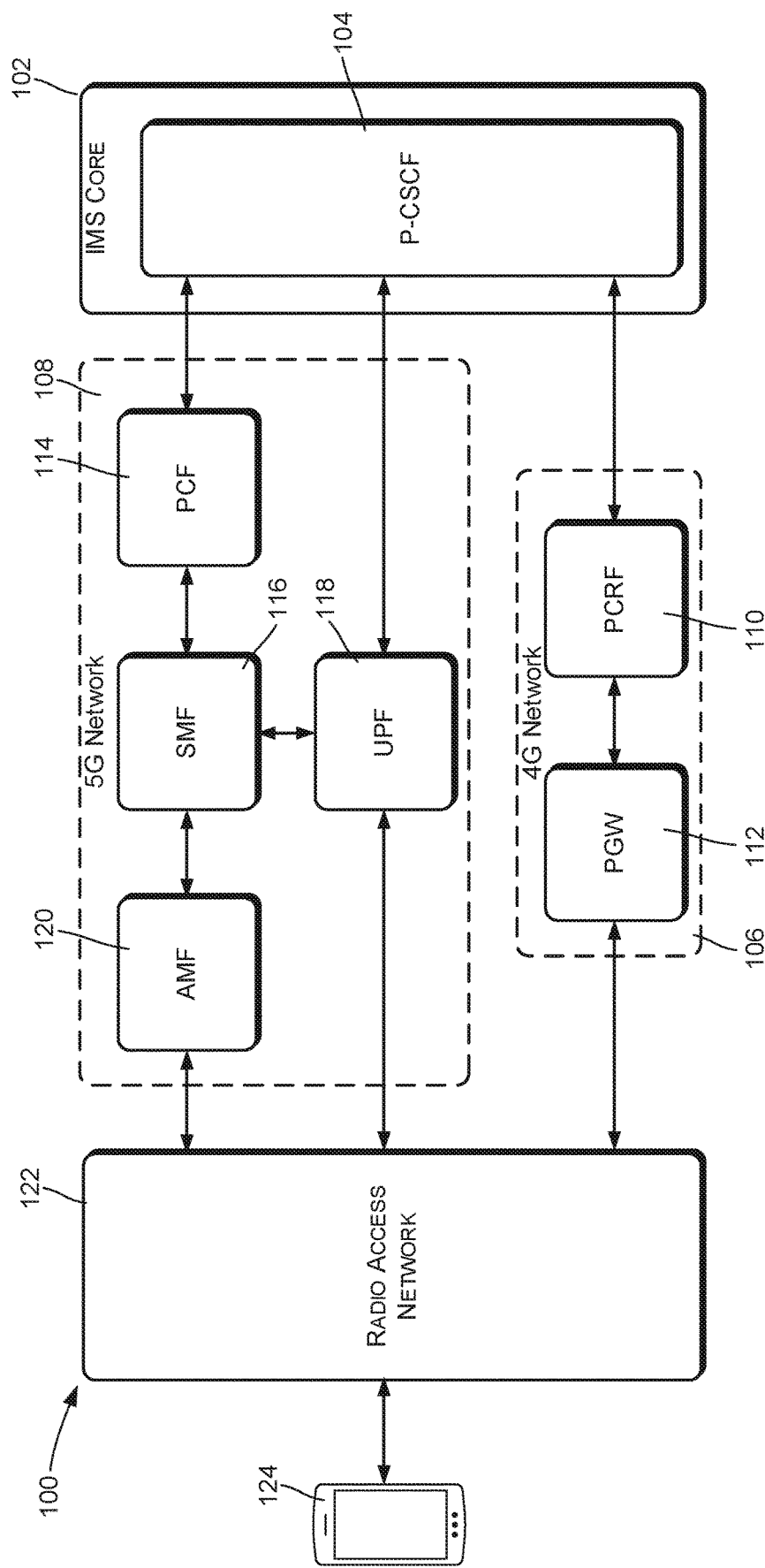
FIG. 1 is a block diagram showing relevant components of a communication network that supports $4^{th}$-Generation (4G) and $5^{th}$-Generation (5G) cellular networking technologies.

FIG. 1 illustrates an example cellular communication system 100 in which the described techniques may be implemented. The system 100 comprises an IP Multimedia Subsystem (IMS) core 102 that provides IP multimedia services such as messaging, video conferencing, and so forth. The system 100 also includes a $4^{th}$-Generation (4G) cellular communication network 106 and a $5^{th}$-Generation (5G) cellular communication network 108, which may be referred to herein as the 4G network 106 and the 5G network 108, respectively.

The IMS core 102 may include various components and functions in accordance with relevant standards and specifications. Most relevant to the discussion below, the IMS core 102 includes a Session Initiation Protocol (SIP) control function, shown in the described embodiment as a Proxy Call Session Control Function (P-CSCF) 104, that is responsible for various functions, including initiating dedicated bearers for voice communication sessions.

The 4G network 106 may comprise a Long-Term Evolution (LTE) network, as one example. The 4G network 106 may have a Policy and Charging Rules Function (PCRF) 110 and a Packet Data Network Gateway (PGW) 112, which may include a user plane PGW (PGW-U) and a control plane PGW (PGW-C). The 4G network may include other components, functions, and nodes that are not shown in FIG. 1.

The 5G communication network may include a Policy Control Function (PCF) 114, a Session Management Function (SMF) 116, a User Plane Function (UPF) 118, and an Access and Mobility Management Function (AMF) 120, among other components, functions, and nodes that are not shown in FIG. 1.

The system may include one or more radio access networks 122, which may include a 4G LTE radio access network and/or a 5G New Radio (NR) radio access network.

The example of FIG. 1 includes a wireless communication device 124 that has 4G cellular communication capabilities and that in some cases may also have 5G cellular communication capabilities. That is, the device 124 is capable of communicating through the 4G network 106 and may or may not be capable of communicating through the 5G network 108.

The wireless communication device 124 may comprise any of various types of wireless communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the wireless communication device 124 may be referred to as a User Equipment (UE) or Mobile Station (MS).

The illustrated components of the 4G circuit-switched communication network 106 and the 5G packet-switched communication network 108 are examples of multiple instances of such components that are used in networks such as those described. Similarly, the illustrated wireless communication device 124 is an example of multiple such devices that are used in conjunction with the networks 106 and 108. Furthermore, the illustrated components are arranged to illustrate certain relationships and communications that are most relevant to the topics discussed herein. In practice, the system 100 may have various other components, functions, and/or nodes, which may use various other communication paths that are not shown in FIG. 1.

In a system such as shown in FIG. 1, a Voice Over IP (VOIP) communication session may be initiated by sending a Session Initiation Protocol (SIP) INVITE message to the P-CSCF 104 of the IMS core 102. The SIP INVITE message may be sent by the device 124 through the UPF 118 of the 5G network 108. The UPF 118 forwards the SIP INVITE message to the IMS core 102. The device 124 is configured to include an information element in the SIP INVITE message indicating whether the device 124 has 5G capabilities.

The P-CSCF 104 responds to the SIP INVITE message by communicating with either the PCRF 110 of the 4G network 106 or the PCF 114 of the 5G network 108 to request a dedicated bearer.

In the case of the 4G network 106, the P-CSCF 104 sends a Diameter-Protocol Authorization Authentication Request (AAR) to the PCRF 110 to initiate establishment of a 4G/LTE dedicated bearer. The PCRF 110 responds by sending a Reauthorization Request (RAR) to the PGW 112. Various additional communications may occur in the process of setting up a 4G/LTE dedicated bearer, including communications with the radio access network 122, in accordance with applicable specifications and standards.

Similarly, in the case of the 5G network 108, the P-CSCF 104 sends a Diameter-Protocol AAR to the PCF 114 to initiate establishment of a 5G/NR dedicated bearer. The PCF 114 responds by sending an N7 update notify message to the SMF 116. Various additional communications may occur in the process of setting up a 5G/NR dedicated bearer, including communications with the radio access network 122, in accordance with applicable specifications and standards.

To determine whether to send an AAR to the PCRF 110 of the 4G network 106 or to the PCF 114 of the 5G network 108, the P-CSCF 104 refers to the capabilities information that has been included in the SIP INVITE message received from the device 124. If the capabilities information indicates that the device 124 supports 5G services, the P-CSCF 104 sends an AAR to the PCF 114. If the capabilities information is absent or does not indicate that the device 124 supports 5G services, the P-CSCF 104 sends the AAR to the PCRF 110.

Although certain techniques are described herein in the context of 4G and 5G communication networks, the techniques described herein may also be used with different network types, standards, and technologies.

Figure 2:
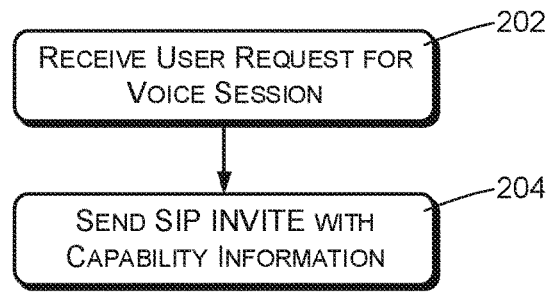
FIG. 2 is a flow diagram illustrating an example method that may be performed by a wireless communication device in accordance with techniques described herein.

FIG. 2 illustrates an example method 200 that may be performed by a cellular or other wireless communication device in accordance with the techniques described herein.

The example method 200 will be described in the context of FIG. 1, although the method is also applicable in other environments.

An action 202, performed by the device 124, comprises receiving a user request to initiate a voice communication session. For example, such a request might result from a user selecting a telephone number or other identifier and entering commands or pressing buttons to initiate a voice call.

An action 204 is performed by the device 124 in response to receiving the user request to initiate the voice communication session. The action 204 comprises sending a Session Initiation Protocol (SIP) INVITE message to a cellular network. The device 124 typically sends the SIP INVITE message to the UPF 118 of the 5G network 108. The UPF 118 forwards the SIP INVITE message to the IMS core 102.

It is assumed for purposes of discussion that the device 124 sends the SIP INVITE message to a cellular communication system that supports both a legacy cellular technology and an advanced cellular technology. As an example, the legacy cellular technology might comprise the 4G network 106 and the advanced cellular technology may comprise the 5G network 108. As another example, the legacy cellular technology might comprise a 5G network and the advanced technology might comprise a future 6$^{th}$-Generation (6G) network. More generally, the advanced network cellular technology may be of a given generation (e.g. 5G) while the legacy cellular technology may be of another generation (e.g. 4G) that is older than the given generation.

In the action 204, the device 124 includes device capability information in the SIP INVITE message. The device capability information may be conveyed, for example, by an Information Element (IE) of the SIP INVITE message, in which a binary flag or other value may indicate whether or not the device 124 supports 5G cellular communications. Note that such an IE may be absent from SIP INVITE messages received from devices that do not support 5G cellular communications.

After sending the SIP INVITE message, the device 124 interacts with various components of the system 100 to complete setting up the requested voice session.

Figure 3:
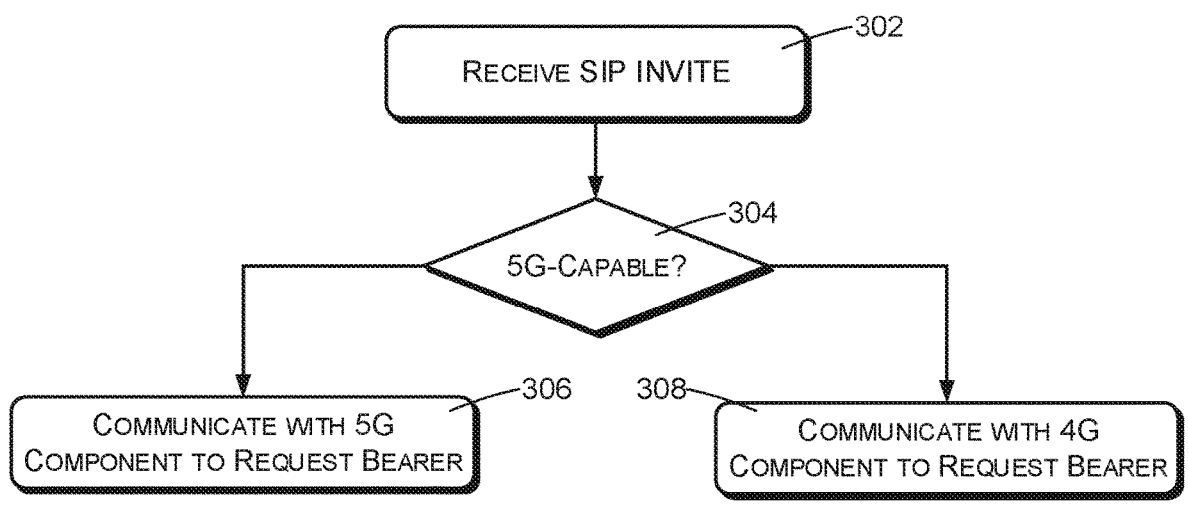
FIG. 3 is a flow diagram illustrating an example method that may be performed by one or more components of a cellular communication system in accordance with techniques described herein.

FIG. 3 illustrates an example method 300 that may be performed by a network system in accordance with the techniques described herein. The example method 300 will be described in the context of FIG. 1, although the method is also applicable in other environments. In FIG. 1, the method may be performed by the IMS core 102, and more specifically by the P-CSCF 104 of the IMS core 102.

An action 302 comprises receiving a SIP INVITE message, from the device 124, to initiate a voice communication session with the device 124. The SIP INVITE message is typically relayed by the UPF 118 from the device 124 to the IMS core 102. The SIP INVITE message may in some cases have an IE indicating whether or not the requesting device 124 supports 5G technologies. In other cases, such as in some cases where the UE does not support 5G technologies, this IE may be absent from the SIP INVITE message.

An action 304, which may be performed by the P-CSCF 104, comprises determining whether the received SIP INVITE message indicates that the requesting device 124 supports 5G cellular communications. In one example, the P-CSCF 104 may obtain device capability information from the SIP INVITE message. For example, the P-CSCF 104 may obtain the device capability information from the previously discussed IE of the SIP INVITE message and determine whether the IE contains a flag or other value indicating that the device 124 supports 5G communications.

In another example, an IE such as this may be absent from the SIP INVITE message, which is interpreted as an indication that the device 124 does not support 5G communications.

In response to determining in the action 304 that the received SIP INVITE message indicates that the requesting device 124 supports 5G cellular communications, an action 306 is performed of communicating with a 5G component such as the PCF 114 to establish a dedicated 5G bearer with the requesting device 124 using a 5G New Radio (NR) radio access network. Specifically, the action 306 may comprise sending an AAR to the PCF 114 to request the dedicated bearer.

In response to determining in the action 304 that the received SIP INVITE message does not indicate that the requesting device 124 supports 5G cellular communications, an action 308 is performed of communicating with a 4G component such as the PCRF 110 to establish a 4G dedicated bearer with the requesting device 124 using a 4G Long-Term Evolution (LTE) radio access network. Specifically, the action 308 may comprise sending an AAR to the PCRF 110 to request the dedicated bearer.

Figure 4:
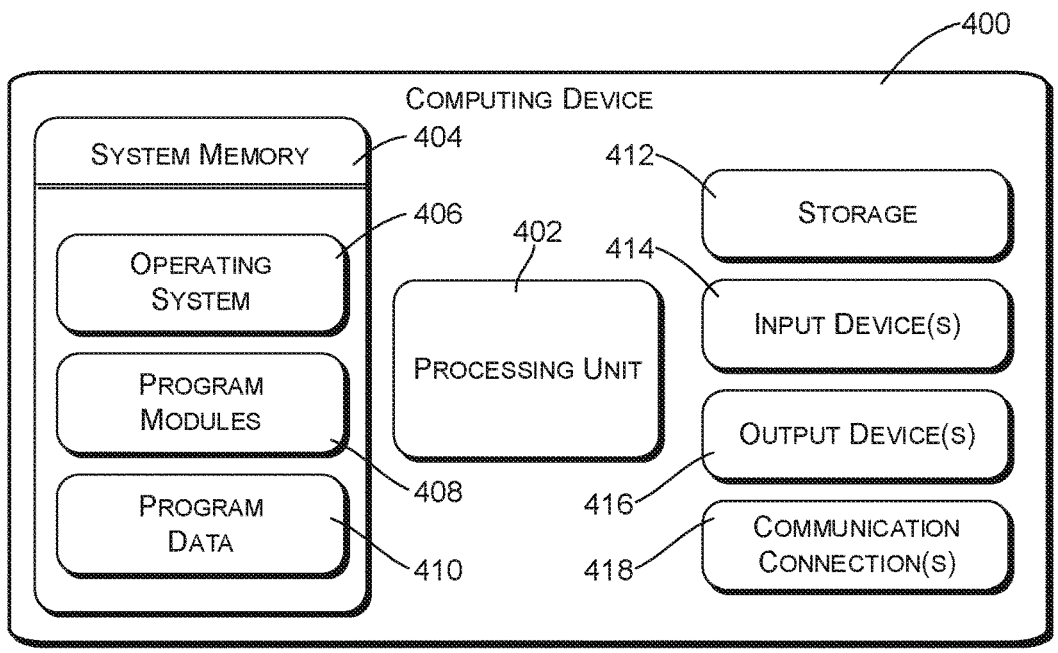
FIG. 4 is a block diagram of an example computing device that may be used to implement various functionality described herein.

FIG. 4 is a block diagram of an illustrative computing device 400 such as may be used to implement various components of a core network, a base station, and/or any servers, routers, gateways, administrative components, functions, or nodes that may be used within the system 100, including components and nodes of the IMS core 102, the 4G network 106, and the 5G network 108.

In various embodiments, the computing device 400 may include at least one processing unit 402 and system memory 404. Depending on the exact configuration and type of computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices (removable and/or non-removable) such as, for example, magnetic disks, optical disks, or tape. Such additional storage devices are illustrated in FIG. 4 as storage 412.

Non-transitory computer storage media of the computing device 400 may include volatile and nonvolatile, removable and non-removable media, implemented in any method or technology for storage of information, such as computer readable instructions, data structures, program modules, or other data. The system memory 404 and storage 412 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 400. Any such non-transitory computer-readable storage media may be part of the computing device 400.

In various embodiment, any or all of the system memory 404 and storage 412 may store programming instructions which, when executed, implement some or all of the function functionality described above.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices.

Figure 5:
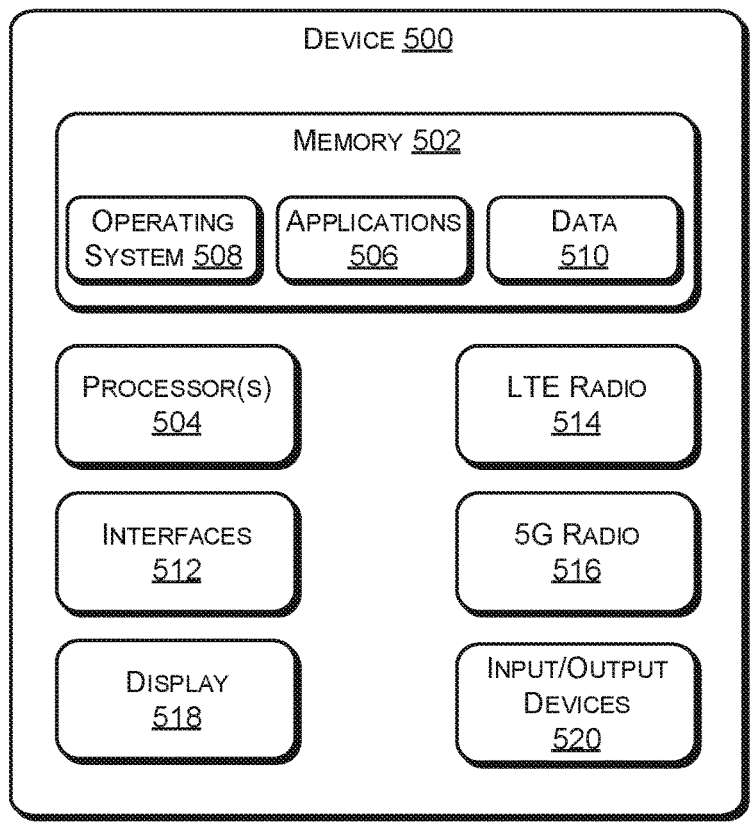
FIG. 5 is a block diagram of an example wireless communication device that may be used in conjunction with the techniques described herein.

FIG. 5 illustrates an example wireless communication device 500 that may be used in conjunction with the techniques described herein. The device 500 is an example of the wireless communication device 124, illustrating high-level components that are not shown in FIG. 1.

The device 500 may include memory 502 and a processor 504. The memory 502 may include both volatile memory and non-volatile memory. The memory 502 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 502 may include a SIM (subscriber identity module), which is a removable smart card used to identify a user of the device 500 to a service provider network.

The memory 502 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 502 may in some cases include storage media used to transfer or distribute instructions, applications, and/or data. In some cases, the memory 502 may include data storage that is accessed remotely, such as network-attached storage that the device 500 accesses over some type of data communication network.

The memory 502 stores one or more sets of computer-executable instructions (e.g., software) such as programs that embody operating logic for implementing and/or performing desired functionality of the device 500. The instructions may also reside at least partially within the processor 504 during execution thereof by the device 500. Generally, the instructions stored in the computer-readable storage media may include various applications 506 that are executed by the processor 504, an operating system (OS) 508 that is also executed by the processor 504, and data 510.

In some embodiments, the processor(s) 504 is a central processing unit (CPU), a graphics processing unit (GPU), both CPU and GPU, or other processing unit or component known in the art. Furthermore, the processor(s) 504 may include any number of processors and/or processing cores. The processor(s) 504 is configured to retrieve and execute instructions from the memory 502.

The device 500 may have interfaces 512, which may comprise any sort of interfaces known in the art. The interfaces 512 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 500 may also have an LTE radio 514 and a 5G radio 516, which may be used as described above for implementing voice communications between mobile devices. The radios 514 and 516 transmit and receive radio frequency communications via an antenna (not shown).

The device 500 may have a display 518, which may comprise a liquid crystal display (LCD) or any other type of display commonly used in telemobile devices or other portable devices. For example, the display 518 may be a touch-sensitive display screen, which may also act as an input device or keypad, such as for providing a soft-key keyboard, navigation buttons, or the like.

The device 500 may have input and output devices 520. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by an IP Multimedia Subsystem (IMS), comprising:
    receiving a first Session Initiation Protocol (SIP) INVITE message to initiate a first voice communication session with a first wireless communication device;
    obtaining first device capability information from the first SIP INVITE message, wherein the first device capability information indicates whether the first wireless communication device supports 5th-Generation (5G) cellular communications;
    determining that the first device capability information indicates that the first wireless communication device supports 5G cellular communications;
    in response to determining that the first device capability information indicates that the first wireless communication device supports 5G cellular communications, communicating with a 5G Policy Control Function (PCF) to establish a first dedicated bearer with the first wireless communication device;
    receiving a second SIP INVITE message to initiate a second voice communication session with a second wireless communication device;
    determining that the second SIP INVITE message does not indicate that the second wireless communication device supports 5G cellular communications; and
    in response to determining that the second SIP INVITE message does not indicate that the second wireless communication device supports 5G cellular communications, communicating with a 4G Policy and Charging Rules Function (PCRF) to establish a second dedicated bearer with the second wireless communication device.

2. The method of claim 1, wherein the first device capability information is within an Information Element (IE) of the first SIP INVITE message.

3. The method of claim 1, further comprising obtaining second device capability information from the second SIP INVITE message, wherein the second device capability information does not indicate that the second wireless communication device supports 5G cellular communications.

4. The method of claim 1, wherein:
    communicating with the 5G PCF comprises sending a first Diameter-Protocol Authorization Authentication Request (AAR) message to the PCF; and
    communicating with the 4G PCRF comprises sending a second Diameter-Protocol AAR message to the 4G PCRF.

5. The method of claim 1, wherein:
    determining that that the first device capability information indicates that the first wireless communication device supports 5G cellular communications is performed by a Call Session Control Function (CSCF) of the IMS; and
    determining that the second SIP INVITE message does not indicate that the second wireless communication device supports 5G cellular communications is performed by the CSCF of the IMS.

6. The method of claim 1, further comprising establishing the first dedicated bearer using a 5G New Radio (NR) radio access network.

7. The method of claim 1, further comprising establishing the second dedicated bearer using a 4G Long-Term Evolution (LTE) radio access network.

8. The method of claim 1, wherein the method is performed by a Call Session Control Function (CSCF).

9. A system comprising:
    one or more processors; and
    programming instructions configured to be executed by the one or more processors to implement an IP Multimedia Subsystem (IMS) to perform operations including:
        receiving a first Session Initiation Protocol (SIP) INVITE message to initiate a first voice communication session with a first wireless communication device;
        obtaining first device capability information from the first SIP INVITE message, wherein the first device capability information indicates whether the first wireless communication device supports 5th-Generation (5G) cellular communications;
        determining that the first device capability information indicates that the first wireless communication device supports 5G cellular communications;
        in response to determining that the first device capability information indicates that the first wireless communication device supports 5G cellular communications, communicating with a 5G Policy Control Function (PCF) to establish a first dedicated bearer with the first wireless communication device;
        receiving a second SIP INVITE message to initiate a second voice communication session with a second wireless communication device;
        determining that the second SIP INVITE message does not indicate that the second wireless communication device supports 5G cellular communications; and
        in response to determining that the second SIP INVITE message does not indicate that the second wireless communication device supports 5G cellular communications, communicating with a 4G Policy and Charging Rules Function (PCRF) to establish a second dedicated bearer with the second wireless communication device.

10. The system of claim 9, wherein the first device capability information is within an Information Element (IE) of the first SIP INVITE message.

11. The system of claim 9, wherein the operations further include obtaining second device capability information from the second SIP INVITE message, wherein the second device capability information does not indicate that the second wireless communication device supports 5G cellular communications.

12. The system of claim 9, wherein:
communicating with the 5G PCF comprises sending a first Diameter-Protocol Authorization Authentication Request (AAR) message to the PCF; and
communicating with the 4G PCRF comprises sending a second Diameter-Protocol AAR message to the 4G PCRF.

13. The system of claim 9, wherein:
determining that that the first device capability information indicates that the first wireless communication device supports 5G cellular communications is performed by a Call Session Control Function (CSCF) of the IMS; and
determining that the second SIP INVITE message does not indicate that the second wireless communication device supports 5G cellular communications is performed by the CSCF of the IMS.

14. The system of claim 9, wherein the operations further include establishing the first dedicated bearer using a 5G New Radio (NR) radio access network.

15. The system of claim 9, wherein the operations further include establishing the second dedicated bearer using a 4G Long-Term Evolution (LTE) radio access network.

16. The system of claim 9, wherein the operations are performed by a Call Session Control Function (CSCF) of the IMS.

17. A non-transitory computer storage medium having programming instructions stored thereon that, when executed by one or more processors, implement an IP Multimedia Subsystem (IMS) to perform operations comprising:
receiving a first Session Initiation Protocol (SIP) INVITE message to initiate a first voice communication session with a first wireless communication device;
obtaining first device capability information from the first SIP INVITE message, wherein the first device capability information indicates whether the first wireless communication device supports 5th-Generation (5G) cellular communications;
determining that the first device capability information indicates that the first wireless communication device supports 5G cellular communications;
in response to determining that the first device capability information indicates that the first wireless communication device supports 5G cellular communications, communicating with a 5G Policy Control Function (PCF) to establish a first dedicated bearer with the first wireless communication device;
receiving a second SIP INVITE message to initiate a second voice communication session with a second wireless communication device;
determining that the second SIP INVITE message does not indicate that the second wireless communication device supports 5G cellular communications; and
in response to determining that the second SIP INVITE message does not indicate that the second wireless communication device supports 5G cellular communications, communicating with a 4G Policy and Charging Rules Function (PCRF) to establish a second dedicated bearer with the second wireless communication device.

18. The non-transitory computer storage medium of claim 17, wherein the operations further comprise obtaining second device capability information from the second SIP INVITE message, wherein the second device capability information does not indicate that the second wireless communication device supports 5G cellular communications.

19. The non-transitory computer storage medium of claim 17, wherein:
determining that that the first device capability information indicates that the first wireless communication device supports 5G cellular communications is performed by a Call Session Control Function (CSCF) of the IMS; and
determining that the second SIP INVITE message does not indicate that the second wireless communication device supports 5G cellular communications is performed by the CSCF of the IMS.

20. The non-transitory computer storage medium of claim 17, wherein the operations further comprise at least one of:
establishing the first dedicated bearer using a 5G New Radio (NR) radio access network; or establishing the second dedicated bearer using a 4G Long-Term Evolution (LTE) radio access network.

\* \* \* \* \*